(12) United States Patent
Laitinen

(10) Patent No.: US 7,331,808 B2
(45) Date of Patent: Feb. 19, 2008

(54) MOVABLE SHIELD WITH SWITCHING MEANS FOR MEMORY CARD

(75) Inventor: Timo Laitinen, Vilala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/439,882

(22) Filed: May 23, 2006

(65) Prior Publication Data

US 2006/0264084 A1 Nov. 23, 2006

Related U.S. Application Data

(63) Continuation of application No. 11/004,160, filed on Dec. 3, 2004, now Pat. No. 7,066,755.

(30) Foreign Application Priority Data

Dec. 3, 2003 (FI) ................................. 20035228

(51) Int. Cl.
*H01R 4/38* (2006.01)
*H01R 13/62* (2006.01)
*H01R 24/00* (2006.01)

(52) U.S. Cl. .................. 439/326; 439/607; 439/630

(58) Field of Classification Search ................ 439/326, 439/607, 489, 630
See application file for complete search history.

(56) References Cited

U.S. PATENT DOCUMENTS

| 5,546,278 | A | 8/1996 | Bethurum ................. 361/737 |
| 5,718,609 | A | 2/1998 | Braun et al. ................. 439/630 |
| 6,149,466 | A * | 11/2000 | Bricaud et al. ............. 439/630 |
| 6,461,193 | B1 | 10/2002 | Matthies ...................... 439/509 |
| 6,805,570 | B1 | 10/2004 | Lee ............................. 439/326 |
| 6,863,537 | B2 * | 3/2005 | Pellizari ...................... 439/31 |

FOREIGN PATENT DOCUMENTS

| EP | 1050837 | 11/2000 |
| EP | 1133065 | 2/2002 |
| EP | 1244178 | 9/2002 |
| WO | WO 02/37703 | 5/2002 |
| WO | 1213680 | 6/2002 |

\* cited by examiner

*Primary Examiner*—Hae M Hyeon
(74) *Attorney, Agent, or Firm*—Alfred A. Fressola; Ware, Fressola, Van Der Sluys & Adolphson LLP

(57) ABSTRACT

A connector housing for receiving a memory card, the housing comprising at least a bottom part and a cover part which is arranged to be movable in relation to the bottom part and which, in turn, comprises at least a shield part and first contact means which are arranged to connect the shield part to the ground level of the device, at least when the cover part is closed. The connector housing also comprises at least second contact means which are arranged to be coupled via the shield part, when the cover part is in the open position. Furthermore, the invention relates to a device comprising a connector housing for a memory card, as well as a method for anticipating the removal of a memory card in the connector housing.

24 Claims, 4 Drawing Sheets

MOVABLE SHIELD WITH SWITCHING MEANS FOR MEMORY CARD

CROSS-REFERENCE TO RELATED APPLICATIONS

This application is a continuation of U.S. patent application Ser. No. 11/004,160 filed on Dec. 3, 2004 now U.S. Pat. No. 7,066,755 and claims domestic priority to said application under 35 USC §120, which in turn claims priority to Finnish Patent Application No. 20035228 filed on Dec. 3, 2003.

FIELD OF THE INVENTION

The invention relates to a connector housing for receiving a memory card, the housing comprising at least a bottom part and a cover part which is arranged to be movable in relation to the bottom part and which, in turn, comprises at least a shield part and first contact means which are arranged to connect the shield part to the ground plane of the device, at least when the cover part is closed. The invention also relates to a device comprising a connector housing for receiving a memory card, the housing comprising at least a bottom part and a cover part which is arranged to be movable in relation to the bottom part and which, in turn, comprises at least a shield part and first contact means which are arranged to connect the shield part to the ground plane of the device, at least when the cover part is closed. Furthermore, the invention relates to a method for anticipating the removal of a memory card in a connector housing, which connector housing for receiving a memory card comprises at least a bottom part and a cover part which is arranged to be movable in relation to the bottom part and which, in turn, comprises at least a shield part and first contact means which are arranged to connect the shield part to the ground plane of the device, at least when the cover part is closed.

BACKGROUND OF THE INVENTION

Various interchangeable memory cards are often used for the storage and transfer of data in various electronic devices. Such cards are available in several types including, for example, a SIM (Subscriber Identity Module) card to be used in mobile communication devices, as well as a Multimedia Card (MMC), a SD (Secure Digital) card, Memory Stick, and Smart Media, which are registered trademarks. Typically, a memory card is connected to the device by means of conductive contacts.

In most uses, one must make sure that the device and/or the memory card are in a suitable state before they are switched off and/or on. A commonly used method to make sure that the card and the devices are de-energized in the switching situations is to place the memory card in such a way that the power source of the device must be disconnected before the switching, for example by placing the memory card behind a battery. However, since it is not always necessary or advantageous to disconnect the whole device for the time of connecting of the memory card, various solutions have been developed to inform the device about possible connecting of the memory card before the actual connecting operation.

U.S. Pat. No. 6,461,193 discloses an arrangement in which a connector housing for receiving a SIM card comprises a switch which is used to generate a signal when the cover of the housing is closed, and the coupling is opened when the housing is opened, for example for replacing the memory card. This arrangement can be used for forming various information, such as advance warning information.

U.S. Pat. No. 5,718,609 discloses an arrangement in which a metal connector housing for a SIM card is used as a kind of a switch. In the arrangement according to one embodiment of the cited invention, the switches of the housing are coupled to the ground plane when a memory card has been placed in the housing. In a corresponding manner, the coupling is turned off when the housing is opened, for example for replacing the memory card.

A problem in the above-presented arrangements is that various types of electrical interference may be coupled to the advance warning circuit.

SUMMARY OF THE INVENTION

It is the primary aim of the present invention to present an improved connector housing for receiving a memory card, to eliminate the drawbacks of the known arrangements and to improve the prior art.

To attain this purpose, the connector housing for receiving a memory card according to the invention primarily comprises at least a bottom part, a cover part arranged to be movable in relation to the bottom part, which cover part, in turn, comprises at least a shield part, first contact means which are arranged for connecting the shield part to the ground level of the device at least when the cover part is closed and wherein the connector housing also comprises at least second contact means which are arranged to be coupled via the shield part, when the cover part is in the open position. The device and the method, in turn, are primarily respectively characterized by features and steps corresponding to the above-mentioned connector housing.

A main idea in the invention is that the shield part, such as an EMC shield, is used as a part of the advance warning circuit, preferably a switch, which advance warning circuit informs the device of at least one preliminary operation prior to the removal of the memory card, such as the unlocking of the cover, before the contact between the memory card and the device is disconnected. The removal of memory cards and particularly SIM and MMC cards without a warning may cause errors in the storage of data on the memory card, and it is thus important that the device can be warned about the removal of the memory card. The invention connects the advance warning to the EMC shield of the memory card in such a way that the contacts of the shield are used both for grounding and for generating an advance warning signal, depending on the position of the shield part of the cover.

In one embodiment of the invention, when the memory card is in its place, the shield part is used as the EMC shield around the memory card, wherein the connecting contacts of the shield part of the cover are used as grounding contacts. When the user wants to remove the memory card, he/she moves the shield part, wherein the shield part switches the advance warning sensors on. In one embodiment, the advance warning sensors comprise at least two contact surfaces, between which a conductive connection is formed by means of the shield part moved in the open position. Thus, an advance warning signal is generated in the device and the device knows that the memory card is being removed and the device has sufficient time to take the necessary steps. In one embodiment, the advance warning signal is only generated when the shield part is entirely in the open position. Thus, for example, the unintentional disconnection of the memory card is avoided, even if the shield part moved slightly.

In one embodiment of the invention, the shield part of the cover is connected to the ground plane when the cover part is in the use position (i.e., closed) and also when the shield part is between the use position and the open position. Thus, during all the above-mentioned time, the shield part is used as an EMC shield around the memory card, preventing e.g. the damaging of the memory card by the effect of an electric discharge.

Furthermore, in an advantageous embodiment of the present invention, the direction of operation of the switch function of the advance warning circuit of the connector housing is selected in such a way that the coupling of the advance warning circuit is not connected in the use operation, i.e. when the memory card has been inserted in the connector housing. In other words, the advance warning circuit is thus not coupled as a part of the electric circuit of the device, wherein the signal does not propagate through the cover when the cover is used as the EMC shield. A possible ESC/EMC "attack" to the cover of the connector housing will not be conducted from the shield to the disconnected advance warning circuit and can thus not disturb the operation of the advance warning circuit. First after the cover has been detached from its shield function, the current of the advance warning circuit is conducted in the cover.

The invention provides significant advantages to the prior art. The advance warning can be implemented in the device in a simple way without space consuming arrangements.

In an advantageous embodiment, a separate conductor will not be needed for transferring the advance warning signal from one advance warning sensor to another, for example, from a positive pole to a negative pole, since the signal can propagate via the metal shield part.

DESCRIPTION OF THE DRAWINGS

In the following, the invention will be described in more detail with reference to the appended principle drawings, in which.

For the sake of clarity, the figures only show the details necessary for understanding the invention. The structures and details which are insignificant in view of understanding the invention but which are obvious for anyone skilled in the art, have been omitted from the figures in order to emphasize the characteristics of the invention.

DETAILED DESCRIPTION OF THE INVENTION

Figure 1:
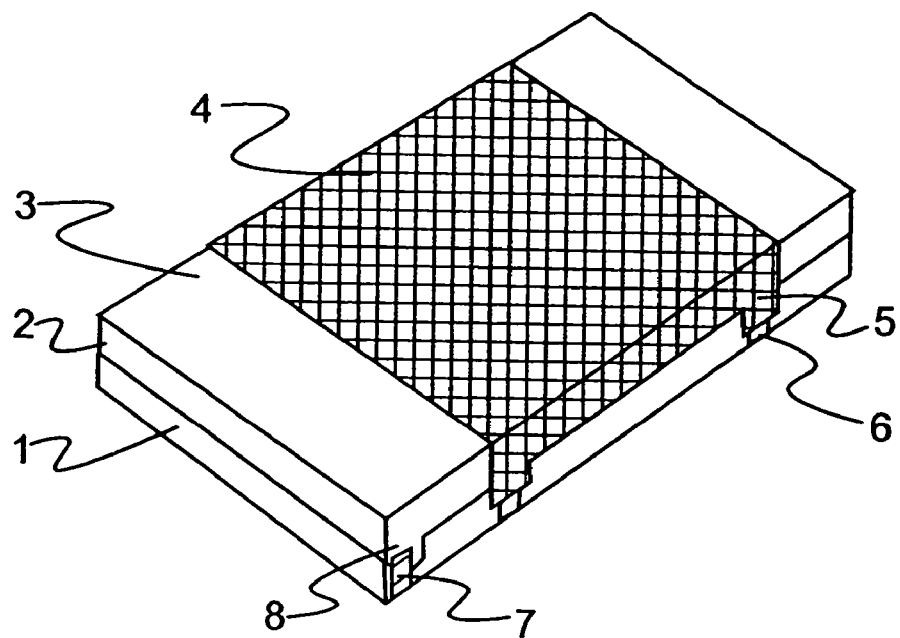
FIG. 1 shows an embodiment of the invention in a perspective view in the so-called use position.

FIG. 1 shows one embodiment of the connector housing, comprising a bottom part 1 and a cover part 2. The bottom part 1 may also be integrated in the rest of the structure of the device, for example the installation base, wherein the cover part 2 is placed directly on the installation base. The cover part 2, in turn, comprises a frame 3 for the cover as well as a shield part 4 arranged to be movable therein. The shield part 4 comprises switching means 5 which are used as ground switches in the use situation shown in FIG. 1. Thus, the switching means 5 are connected to the grounding contacts 6 of the bottom part 1. The grounding contacts 6 may also be arranged directly on the installation base of the connector housing, i.e., typically on the surface of a circuit board. Said grounding contacts 6 are connected to the ground plane of the device. In some embodiments, the grounding contacts 6 can also be used for other purposes. For example, the signal propagation path can be arranged through the grounding contacts 6 in such a way that the signal informs the device about the cover part 2 being shut.

The cover part 2 and the bottom part 1 of the connector housing are connected to each other via a hinge structure 8. A variety of structures can be used as the hinge structure 8, one advantageous embodiment being shown in FIG. 1.

The cover part 2 can be implemented in a number of ways, and, for example, it can be designed in different shapes according to the need.

In one advantageous embodiment, the cover part 2 is as long as the whole memory card and is designed in such a way that it can enclose the whole memory card inside the connector housing. In another embodiment, the length of the cover part 2 is only a part of the length of the card. Thus, only a part of the card is placed inside the connector housing, wherein it is easy for the user to visually check the card placed in the connector housing.

The connector housing can be implemented in a number of ways and be made of various materials. However, at least the shield part 4 is preferably made of a material which conducts electricity and dampens electromagnetic radiation, such as a thin steel plate. It is also possible to make the parts of the connector housing of several materials and/or to coat the parts to obtain the desired electrical and other properties.

Figure 2:
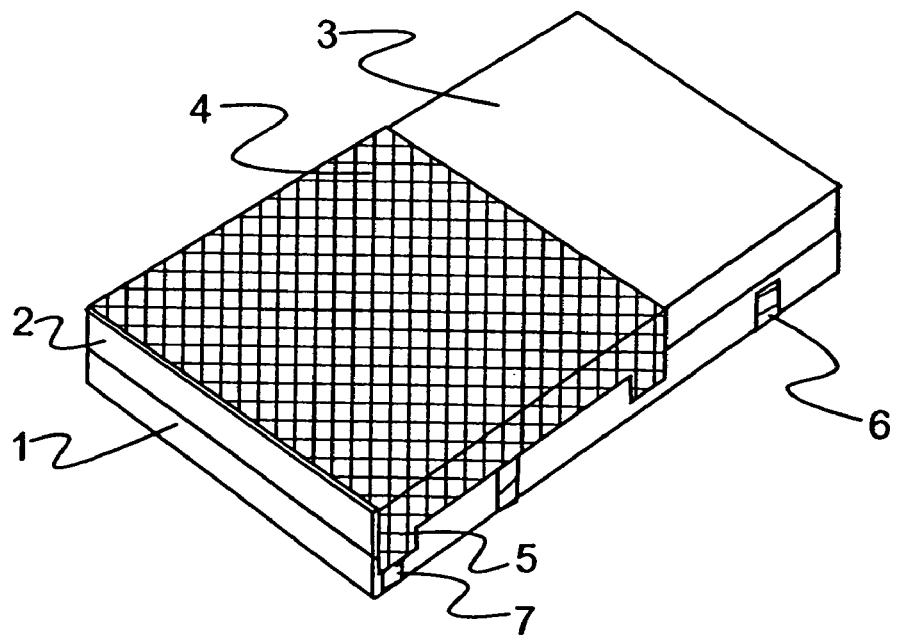
FIG. 2 shows the embodiment of FIG. 1 in the so-called open position, the series of FIGS. 3 to 5 illustrates the operation of the connector housing in side views.
Figure 3:
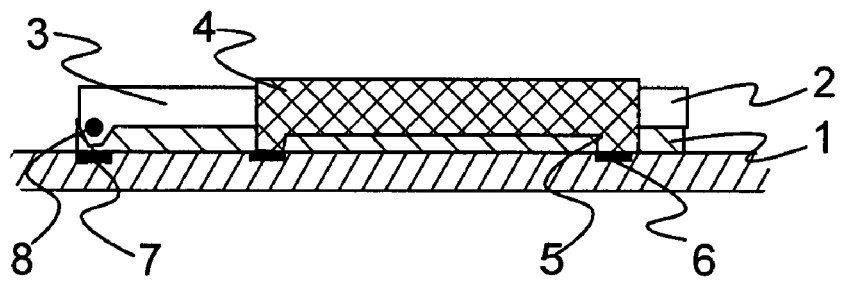
Figure 4:
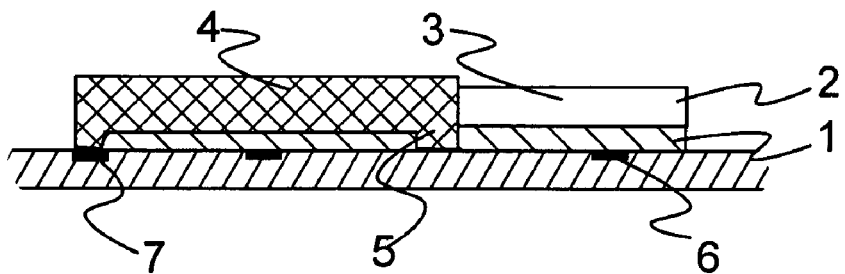
Figure 5:
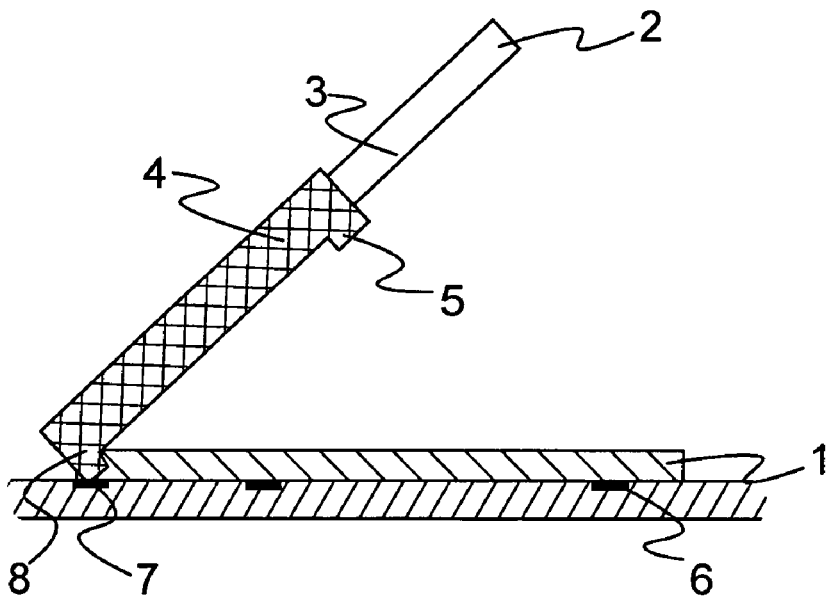

In one embodiment of this invention, the characteristic feature is in the switching means 5 of the cover shield part 4, which have a different function when the shield part is in different positions. This operation is illustrated in FIGS. 1 and 2 as well as in the series of FIGS. 3 to 5. In the first position, or in the so-called use position, the switching means 5 of the shield part 4 are used as shielding contacts as shown in FIGS. 1 and 3. Thus, in one embodiment, the coupling of the advance warning signal circuit corresponds to the situation of FIG. 8. In the second position, or in the so-called open position, the switching means 5 of the shield part 4 are used as a switch for the advance warning signal, as shown in FIGS. 2, 4 and 5. Thus, in one embodiment, the coupling of the advance warning signal circuit corresponds to the situation of FIG. 9.

In FIGS. 1 and 3, the metal shield part 4 of the cover part 2 is grounded at each edge to the ground plane of the device. One main function of the shield part 4 is to protect the memory card during its use from electrical interference, such as spurious electromagnetic radiation. Furthermore, when the memory card is being detached from the device, said shield part 4 is used as a shield for the memory card from a static electric discharge. The user may possibly cause a static electric discharge in the cover part 2 of the connector housing when touching the connector housing with a finger. The shield part 4 of the cover part 2 conducts the electric discharge to the ground level of the device. After the equipotential bonding, the user moves the shield part 4 by gliding it. At this stage, the shield part 4 is no longer needed for the shielding purpose, because the voltage levels of the user and the device have already been equalized. The switching means 5 arranged in the grounding of the shield part 4 disengage from the ground level of the device at the gliding stage, and at least some of them are shifted to the contact use of the advance warning circuit.

When the shield part 4 has been deflected to its rear position, as shown in FIGS. 2 and 4, the advance warning signal from the advance warning coupling is directed to the shield part 4 of the cover 2 via the signal contact 7. From the first signal contact 7, the electric circuit is formed via the shield part 4 of the cover part 2 to the second signal contact and further to the device. The signal contacts 7 can be implemented in a variety of ways. Preferably, the first signal contact 7 is in the first hinge edge and the second signal contact is in the second hinge edge. The signal contacts 7 can also be placed in several different places, for example in the bottom part 1, in the cover frame 3, or in the installation base. In one embodiment, the main idea is to arrange at least two signal contacts in connection with each other on the shield part 4. In this way, it is possible to generate an advance warning signal to indicate that the memory card is possibly being detached from the connector housing. When the user detaches his/her fingers from the top of the cover part 2 in the open position, the cover part is opened, as shown in FIG. 5. Thus, the memory card is detached from the contacts of the connector housing, but the advance warning time necessary for the operation of the device has been reached. The advance warning signal is preferably on as long as the connector housing is closed and the shield part 4 is moved to the locking position.

Figure 6:
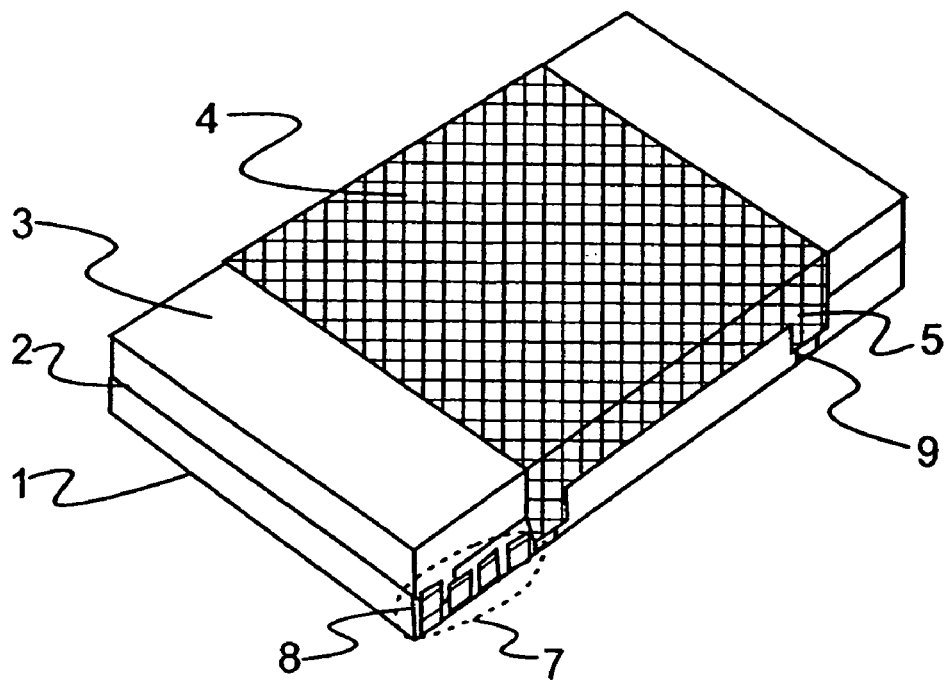
FIG. 6 shows another embodiment of the invention in a perspective view in the use position.

In one embodiment of the invention, shown in FIG. 6, several signal contacts 7 are provided. This solution makes it possible to determine the position more accurately than the position of the shield part 4. In some embodiments, it is also possible to determine the direction of movement of the shield part 4. Similarly, the number of grounding contacts 6 used for grounding may differ from that given in the examples and, for example, it is possible to provide a substantially integrated grounding contact 6. In one embodiment of the invention, the shield part 4 of the cover is connected to the grounding contacts 6 when the cover part is in the use position (i.e., closed) and also when the shield part is between the use position and the open position. Thus, during all the time of the above-mentioned movement, the shield part 4 is used as an EMC shield, preventing e.g. the damaging of the memory card by the effect of an electric discharge.

The placement of the memory card is not shown in more detail in the figures, because the connector housing according to the invention can be implemented in a variety of ways, for example by placing the memory card in the cover 2 or in the bottom part 1 or on the circuit board. In an advantageous embodiment, the cover 2 is provided with clips between which the memory card can be inserted. The clips are preferably designed in such a way that the memory card is inserted between the clips when the cover 2 of the connector housing is in the open position. In some embodiments, it may be advantageous to arrange the connector housing in such a way that the memory card is placed directly on top of the bottom part 1 or the circuit board. Thus, the closed cover part 2 advantageously presses the memory card against the contacts and keeps the card in its position.

When the memory card is inserted in the connector housing and the shield part 4 of the cover of the connector housing is moved to the locking position, the advance warning signal circuit is opened. At the same time, the electrical shielding formed by the cover 2 and the ground level of the device is turned on. In an advantageous embodiment, the shield part 4 is coupled at its four edges to the ground level of the device.

In the exemplified embodiment of the invention, the direction of action of the switch function of the connector housing is selected so that the advance warning signal circuit is open in the use position of the connector housing, that is, when the memory card is inserted in the connector housing. Thus, the advance warning signal is not passed via the cover 2 at the same time when the shield part 4 of the cover is used as an EMC cover, wherein a possible ESD/EMC interference on the cover part 2 of the connector housing is not conducted to the advance warning circuit but preferably to the ground level of the device. Thus, in the use position, interference on the cover part 2 of the connector housing cannot disturb the operation of the advance warning signal circuit.

Figure 7:
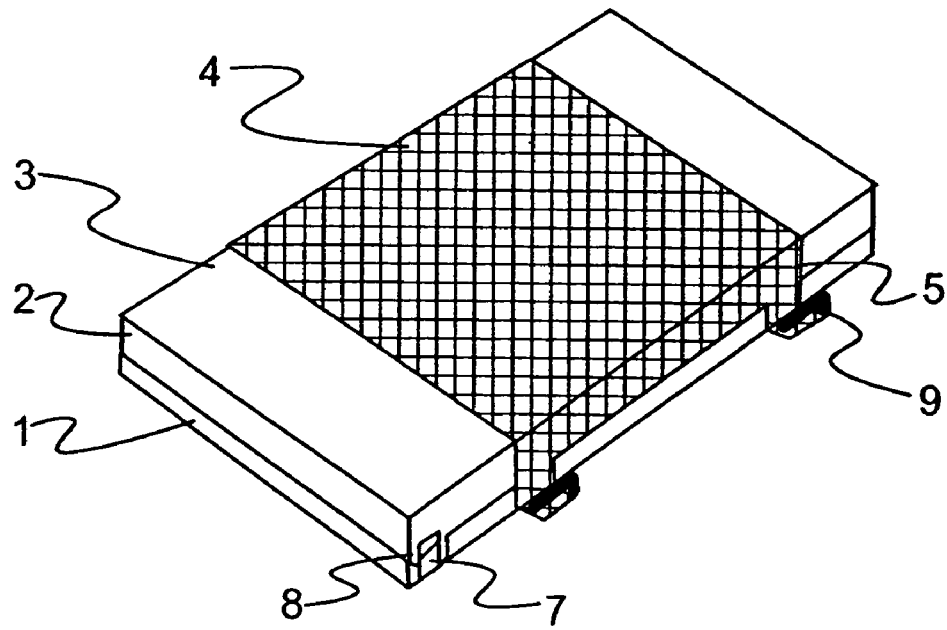
FIG. 7 shows a third embodiment of the invention in a perspective view in the use position.

The locking of the cover part 2 in the use position can be implemented in a variety of ways. FIGS. 1 and 2 do not show the locking in more detail, because the primary aim of the figures is to illustrate the movement of the shield part 4 and the placement of the switching means 5 in the different functional positions. The locking can be implemented, for example, by various claw and hook structures. The structures can be either integrated in the shield part 4 or separate structures. One advantageous embodiment comprises a locking structure integrated in the shield part 2 as shown in FIG. 7. Thus, the switching means 5 of the shield part 4 are placed, in the locking position, in some kind of hooks 9. Preferably, the hooks 9 e.g. prevent the opening of the cover part 2 and form the grounding contacts 6, via which the shield part 4 is coupled to the ground level of the device. The hooks 9 can be placed either in the frame part 1 or the installation base of the connector housing, and they can be designed in a number of ways.

The connector housing according to the invention can be adapted for use as a connector housing for a variety of memory cards in different uses and devices. Typical uses include mobile phones, digital cameras, personal digital assistants (PDA devices), computers; in other words, devices in which there is a need to use compact interchangeable memory cards for the storage and/or transfer of data. The connector housing according to the invention can be placed in the device in a number of different ways. For example, the connector housing can be placed behind the battery, wherein the battery must be removed before the use of the connector housing. Because the connector housing according to the invention makes it possible to use an advance warning signal, it is advantageous to place the connector housing in such a way that its use is as easy as possible. For example, in some embodiments, when the connector housing is placed in a different position than behind the power source, the memory card can be used without switching off the device.

In the above-presented examples, the shield part 4 of the cover of the connector housing was made of metal. However, it is also possible to make the shield part 4 of another material and/or to coat it in a suitable way. In one embodiment, the shield part 4 and the lid of the space for the memory card are integrated. Thus, when the lid of the space for the memory card is moved, the shield part 4 is also moved. In an advantageous embodiment, the lid is made of a conductive material, wherein the possible potential difference between the user and the device is equalized before the user touches the memory card.

Figure 8:
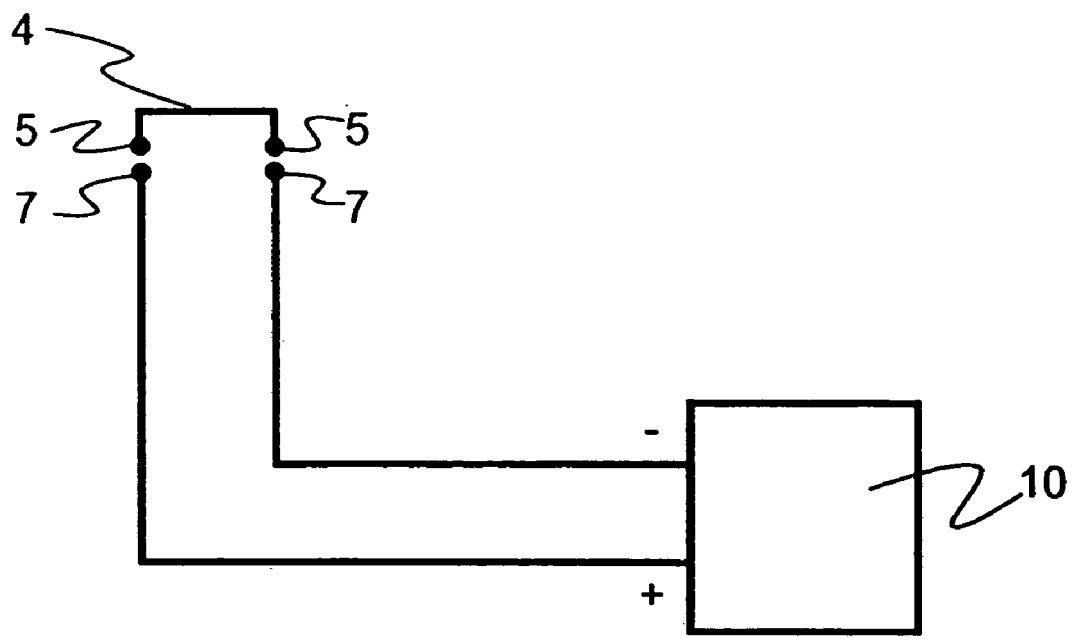
FIGS. 8 and 9 illustrate the advance warning signal circuit according to one embodiment of the invention.
Figure 9:
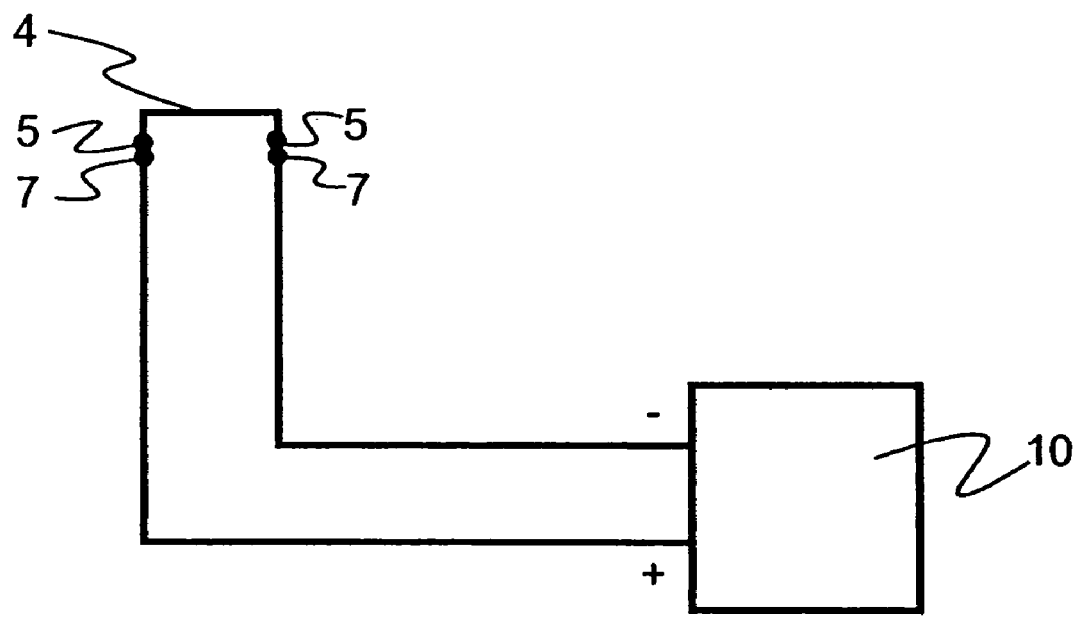

FIGS. 8 and 9 show, in principal views, the operation of the advance warning signal circuit in the device. In the example shown in the drawings, the shield part 4 and particularly its switching means 5 are used as a part of the coupling structure, and the signal contacts 7 are used as another part. The switching means 5 and the signal contacts 7 are brought into contact by a movement of the shield part 4 in the above-described manner. Thus, the advance warning signal circuit is closed, as shown in FIG. 9, wherein an advance warning signal can be generated by the advance warning circuit 10 in the device. Preferably, this information is used for controlling the device, for example for controlling the storage of data on the memory card. The advance warning circuit 10 can be implemented in a variety of ways, and one advantageous way is to integrate the functions of the advance warning circuit in the other parts of the device.

By combining, in various ways, the modes and structures presented in connection with the different embodiments of the invention presented above, it is possible to produce various embodiments of the invention in accordance with the spirit of the invention. Therefore, the above-presented examples must not be interpreted as restrictive to the invention, but the embodiments of the invention can be freely varied within the scope of the inventive features presented in the claims hereinbelow.

What is claimed is:

1. An apparatus comprising:
    a bottom part;
    a cover part, movably attached to the bottom part and dimensioned for at least partial receipt of a memory card, comprising at least a shield part, wherein the shield part is attached to the cover part so that the shield part is movable in relation to the cover part;
    at least one first contact located on said bottom part, said at least one first contact for connecting the shield part to a ground level of at least said apparatus at least when said shield part is in a first position; and
    at least one second contact located on said bottom part, said at least one second contact for connection with said shield part, when said shield part is in a second position.

2. The apparatus according to claim 1, wherein the at least one second contact comprises at least two contact surfaces, between which an electric connection can be formed on the shield part.

3. The apparatus according to claim 1, wherein the at least one second contact comprises several pairs of contact surfaces, wherein an electric connection can be formed on the shield part between the contact surfaces of the individual pairs.

4. The apparatus according to claim 1, wherein the cover part also comprises a frame for the cover part, wherein the shield part is movably attached to the frame.

5. The apparatus according to claim 1, wherein the shield part is dimensioned to be used as a part of a locking mechanism for preventing opening of the cover part.

6. The apparatus according to claim 1, further comprising an advance warning circuit configured to generate an advance warning signal, to which at least the at least one second contact is connected.

7. A mobile phone comprising the apparatus of claim 1.

8. A digital camera comprising the apparatus of claim 1.

9. A personal digital assistant comprising the apparatus of claim 1.

10. A computer comprising the apparatus of claim 1.

11. A device comprising the apparatus of claim 1, wherein the ground level of said apparatus is a ground level of said device.

12. A device comprising the apparatus of claim 1, wherein the at least one first contact and the at least one second contact of said apparatus are located on said device.

13. An apparatus comprising:
    a bottom part,
    means for at least partially receiving a memory card, comprising at least means for providing electrical shielding, said means for providing electrical shielding movably attached to a cover part, wherein said cover part is movably attached to the bottom part;
    first contact means for connecting the means for shielding to a ground level of said apparatus at least when said means for shielding is in a first position; and
    second contact means for connection with said means for shielding, when said means for shielding is in a second position;
    wherein said first contact means and said second contact means are located on the bottom part.

14. The apparatus according to claim 13, further comprising means for generating an advance warning signal, to which at least the second contact means are coupled.

15. A device comprising the apparatus of claim 13, wherein the ground level of said apparatus is a ground level of said device.

16. A device comprising the apparatus of claim 13, wherein the first contact means and the second contact means of said apparatus are located on said device.

17. A method comprising:
    connecting a shield part forming part of a cover part to a ground level of an apparatus at least when said shield part is in a first position, wherein the cover part is dimensioned for at least partial receipt of a memory card, the shield part is movably attached to the cover part and said cover part is movably attached to a bottom part, said connecting by at least one first contact located on said bottom part; and
    connecting at least one second contact located on said bottom part with said shield part, when said shield part is in a second position.

18. The method according to claim 17, wherein the at least one second contact comprises at least two contact surfaces, between which an electric connection is formed on the shield part.

19. The method according to claim 17, further comprising generating an advance warning signal by the at least one second contact.

20. An apparatus comprising:
    first means for connecting a shield part of said apparatus to a ground level of the apparatus at least when said shield part is in a first position, wherein the shield part forms part of a cover part of said apparatus, wherein the cover part is dimensioned for at least partial receipt of a memory card, wherein the shield part is movably attached to the cover part and said cover part is movably attached to the bottom part, wherein the first means for connecting comprises at least one first contact located on said bottom part; and
    second means for connecting at least one second contact located on said bottom part with said shield part, when said shield part is in a second position.

21. The apparatus according to claim 20, wherein the at least one second contact comprises at least two contact surfaces, between which an electric connection is formed on the shield part.

22. The apparatus according to claim 20, further comprising means for generating an advance warning signal by the at least one second contact.

23. A device comprising the apparatus of claim 20, wherein the ground level of said apparatus is a ground level of said device.

24. A device comprising the apparatus of claim 20, wherein the first contact means and the second contact means of said apparatus are located on said device.

* * * * *

UNITED STATES PATENT AND TRADEMARK OFFICE
CERTIFICATE OF CORRECTION

PATENT NO. : 7,331,808 B2
APPLICATION NO. : 11/439882
DATED : February 19, 2008
INVENTOR(S) : Laitinen It is certified that error appears in the above-identified patent and that said Letters Patent is hereby corrected as shown below:

1. At column 8, claim 20, line 45, please remove "the bottom part" and replace with --a bottom part--.

Signed and Sealed this

First Day of July, 2008

JON W. DUDAS
*Director of the United States Patent and Trademark Office*